United States Patent [19]

Redey

[11] Patent Number: 4,935,316
[45] Date of Patent: Jun. 19, 1990

[54] OVERDISCHARGE PROTECTION IN HIGH-TEMPERATURE CELLS AND BATTERIES

[75] Inventor: Laszlo Redey, Downers Grove, Ill.

[73] Assignee: The United States of America as represented by the United States Department of Energy, Washington, D.C.

[21] Appl. No.: 384,604

[22] Filed: Jul. 25, 1989

[51] Int. Cl.$^5$ .................... H01M 10/39; H01M 10/44
[52] U.S. Cl. ...................................... 429/50; 429/112; 429/218; 429/221; 429/223
[58] Field of Search .................... 429/50, 60, 103, 112, 429/218, 221, 223, 90

[56] References Cited

U.S. PATENT DOCUMENTS

| | | | |
|---|---|---|---|
| 3,957,532 | 5/1976 | Settle et al. | 429/218 |
| 4,079,303 | 3/1978 | Cox | 320/17 |
| 4,238,721 | 12/1980 | DeLuca et al. | 320/18 |
| 4,324,846 | 4/1982 | Kaun et al. | 429/112 |
| 4,414,093 | 11/1983 | Redey et al. | 204/412 |
| 4,728,590 | 3/1988 | Redey | 429/221 |

OTHER PUBLICATIONS

U.S. patent application Ser. No. 227,021, filed Aug. 1, 1988, allowed Feb. 6, 1989.
Redey, "Chemical Overcharge/Overdischarge Protection for Li-Alloy/Transition Metal Monosulfide Cells", Presentation at the Electrochemical Society, Inc. Symposium, Oct. 1988.

Primary Examiner—Anthony Skapars
Attorney, Agent, or Firm—Hugh W. Glenn; Robert J. Fisher; William R. Moser

[57] ABSTRACT

Overdischarge indication and protection is provided in a lithium alloy - metal sulfide, secondary electrochemical cell and batteries of such cells through use of a low lithium activity phase that ordinarily is not matched with positive electrode material. Low lithium activity phases such as $Li_{0.1}Al_{0.9}$ and LiAlSi in correspondence with positive electrode material cause a downward gradient in cell voltage as an indication of overdischarge prior to damage to the cell. Moreover, the low lithium activity phase contributes lithium into the electrolyte and provides a lithium shuttling current as overdischarge protection after all of the positive electrode material is discharged.

16 Claims, 5 Drawing Sheets

| First, Positive Electrode: Metal Sulfide |
|---|
| Liquid or Immobilized Electrolyte |
| Second, Negative Electrode: Lithium Alloy |

FIG. 1

OVERDISCHARGE PROTECTION IN HIGH-TEMPERATURE CELLS AND BATTERIES

CONTRACTUAL ORIGIN OF THE INVENTION

The United States government has rights in this invention under Contract No. W-31-109-ENG-38 between the U.S. Department of Energy and Argonne National Laboratory.

CROSS REFERENCE TO RELATED APPLICATION

U.S. patent application Ser. No. 227,021, filed Aug. 1, 1988, now U.S. Pat. No. 4,849,309, to Laszlo Redey and Paul A. Nelson, "Overcharge Tolerant High-Temperature Cells and 10 Batteries" is hereby incorporated by reference for the purpose of describing methods, cells and batteries incorporating overcharge protection.

BACKGROUND OF THE INVENTION

This invention relates generally to the discharging of electrochemical cells having lithium-alloy negative electrodes and is particularly directed, but not limited, to protecting a high temperature lithium-alloy/metal sulfide cell and batteries from damage due to over-discharging.

Lithium-alloy/metal sulfide cells are characterized by high storage capacity and power capability per unit weight. The individual cells are typically of the high-temperature type and are coupled in series and/or parallel to form batteries for the storage of electric power.

It has long been recognized that overcharge protection is necessary in recharging of electrochemical cells and batteries of such cells to prevent or minimize damage to those cells that are charged to well beyond their rated capacity. This is a particularly difficult problem in a series-connected battery where cells have been discharged to varying levels and are recharged at varying rates depending on their internal characteristics.

Representative literature addressing these problems are shown in U.S. Pat. No. 4,324,846 to Kaun et al. which utilizes a ternary alloy of iron-aluminum-lithium or nickel-aluminum-lithium or cobalt-aluminum-lithium to provide a specific overcharge capacity to afford a limited overcharge protection. Electric overcharge protection has also been employed such as taught in U.S. Pat. Nos. 4,079,303 to Cox and 4,238,721 to DeLuca et al. These patents disclose electrical systems for charging multi-cell storage batteries in a manner which prevents individual cell overcharging. The former patent removes any cell from the charging cycle which reaches a predetermined charge voltage limit, while the latter equalizes the charge of each individual cell at a selected full charge voltage by shunting current around any cell having a voltage exceeding this selected voltage.

Prior to the inventor's efforts, it was not realized the extent to which over-discharging causes irreversible damage in vulnerable cells of a battery. Without some means of protection in both serially and parallel connected cells, over-discharging may destroy cells within a few cycles. The inventor has found that the overdischarge of lithium-aluminum, negative electrodes can result in aluminum dissolution into the electrolyte and aluminum precipitation into the electrode separator following recharge. This build-up of aluminum is cumulative and can partially short a cell after a few cycles. The defective cell or cells in a battery will progressively become worse, reducing the battery output and resulting in overheating of the battery.

In addition, a deeply discharged negative electrode exhibits a low lithium activity phase that further decreases the effectiveness of a cell. For example alpha lithium-aluminum alloy (about $Li_{0.1}Al_{0.9}$) and LiSiAl both exhibit reduced open circuit voltage and increased polarization as negative electrode material in comparison with corresponding materials of greater lithium concentrations. Accordingly, prior workers have avoided cell designs requiring electrochemical reaction of these low lithium activity phases.

In view of these problems in prior art electrochemical cells and batteries, many of which problems were not previously recognized, it is an object of the present invention to provide an improved electrochemical cell.

It is another object of the present invention to limit or prevent overdischarge damage in a high temperature electrochemical cell.

Yet another object of the present invention is to provide an electrochemical cell including a lithium alloy, negative electrode with the capability of avoiding aluminum dissolution on discharge of the cell.

A further object of the present invention is to provide an electrochemical cell having overdischarge indication and overdischarge reserve.

It is a further object of the present invention to provide an electrochemical cell with means for overdischarge prevention.

A still further object of the present invention is to provide an electrochemical cell with the combination of overdischarge and overcharge protection.

One other object of the present invention is to provide an overdischarge protection method in a battery of secondary electrochemical cells.

It is yet another object of the present invention to provide a method of monitoring battery output voltage for overdischarge protection.

SUMMARY OF THE INVENTION

In accordance with the present invention an electrochemical cell is provided having overdischarge indication and overdischarge reserve. The electrochemical cell is characterized by an output voltage plateau throughout the midportion of the cell operating cycle and a gradient in output voltage towards the discharged end of the cycle. The cell includes a negative electrode containing lithium alloy as active material in the charged state and a matrix containing aluminum in the uncharged state. The negative electrode is characterized by a voltage plateau at the central portion of the cell cycle and a gradient in voltage towards the discharge end of the cell cycle. The gradient in negative electrode voltage results from the presence of a low lithium activity phase that is leaner in lithium than the lithium alloy phase present in the midportion of the cell operating cycle. The positive electrode contains transition metal chalcogenide, as active material in the charged state and transition metal with lithium chalcogenide in the uncharged state. It includes sufficient, charged active material to be present concurrently with the low lithium activity phase in the negative electrode when the cell exhibits electrochemical capacity at the lower output voltage.

In one other aspect of the invention, the negative electrode material is selected from lithium alloy systems including: Li-Al, Li-Al-Si, Li-Al-Fe, Li-Al-Ni, Li-As- Co, and four component compositions of Li-Al-Si in mixture with Fe, Ni, or Co all with varying stoichiometric ratios among the constituents. Where the Li-Si-Al system is selected for use, it will include a low lithium activity phase with less stoichiometric lithium than is in the LiSiAl phase. Si will be included in an amount of about 0.1 to 1.0 of the atomic fraction of Al in the alloy matrix.

In one other aspect of the invention, the battery of cells include electronically conducting means connected to individual cells within the battery for indicating overdischarge condition and for electronically shunting the cell from the battery of cells when destructive overdischarge is indicated.

In one other aspect of the invention, the electrochemical cells include negative electrodes linked to the state of charge of the corresponding positive electrodes so as to provide low lithium activity phase beyond the presence of positive electrode charged material. This unmatched, low lithium activity phase is capable of providing $Li^+$- $Li^0$ shuttling in the electrolyte for limiting destructive overdischarge current in the cells.

The present invention also contemplates an overdischarge protection method in a battery of secondary electrochemical cells in which the cells have lithium alloy negative electrodes and transition metal chalcogenide, positive electrodes. The negative electrodes exhibit a plateau in discharge voltage over a major portion of their discharge capacity and a gradient in discharge voltage at the discharged end of their capacity corresponding to a low lithium activity phase. The positive electrodes exhibit a plateau voltage over a major portion of their discharge capacity extending from correspondence with the negative electrode plateau into and concurrent with a major portion of the anode capacity at low lithium activity phase. The battery voltage and current (or power) is monitored and the output current is reduced when the voltage drops to a level corresponding to the gradient in negative electrode voltage to prevent irreversible damage in the most deeply discharged cells.

In other aspects of the inventive method, sufficient positive electrode capacity is provided in respect to the negative capacity to extend the positive electrode plateau at least until all of the low lithium activity phase has been discharged following which the battery operation is terminated before a predetermined minimum in output voltage corresponding to polarity reversal of a cell is reached.

In other aspects of the method sufficient low lithium activity phase is provided to extend beyond discharge all of the transition metal chalcogenide in the positive electrode following which the battery is discharged at a reduced current to protect the most deeply discharged cells by a lithium shuttling mechanism.

In other aspects, the overdischarge protection method is employed in combination with overcharge protection where the positive electrodes of the electrochemical cells are provided with a transition metal capacity that extends beyond the rechargeable lithium alloy capacity in the negative electrode and the cells are charged to near their lithium alloy capacity at a first charge rate and beyond their lithium alloy capacity at a second reduced charge rate balanced by lithium transport between the electrodes.

BRIEF DESCRIPTION OF THE DRAWINGS

The present invention is illustrated in the accompanying drawings wherein:

FIG. 1 is a simplified schematic diagram of a high-temperature lithium-alloy/metal sulfide cell;

DETAILED DESCRIPTION OF THE PREFERRED EMBODIMENT

The present invention involves the use of overdischarge indication and overdischarge protection. Overdischarge indication is brought about when a low lithium activity phase is relied on for the negative electrode contribution to the cell output voltage. Overdischarge protection is achieved either by reducing or terminating the operating current or by operation of an $Li^+$-$Li^0$ shuttling mechanism in deeply discharged cells.

FIG. 1 illustrates a cell in the form of three layers in a simplified schematic diagram. In one embodiment, the negative electrode in the operating mode includes lithium-aluminum-silicon while the positive electrode in the operating mode includes a metal chalcogenide. An immobilized electrolyte including a lithium containing molten salt is disposed between the electrode.

Although various metal chalcogenides such as NbSe, $V_2O_5$ can be selected for use in the positive electrode, in a preferred embodiment, a metal sulfide comprised of FeS, $Li_2FeS_2$, $FeS_2$, NiS, $NiS_2$, CoS or $CoS_2$, or a mixture of these is selected. The immobilized electrolyte in a preferred embodiment is comprised of a mixture of MgO powder and molten salt, which is, in turn, in a mixture of either 22 m% LiF-31 m% LiCl-47 m% LiBr or 25 m% LiCl-37 m% LiBr-38 m% KBr salts.

The negative electrode is comprised of a lithium alloy such as $Li_xAl$ or $Li_x(Al_ySi_{1-y})$ where:

$$0<y<1 \text{ and } x<[1.13y+4(1-y)]$$

Other matrix metals than Al or Al-Si are available for use such as AlFe, AlNi, AlCo, or Si alone. It also will be appreciated that lithium can also be supplied into the cell as $Li_2S$ in the fabrication of the positive electrode.

Figure 2:
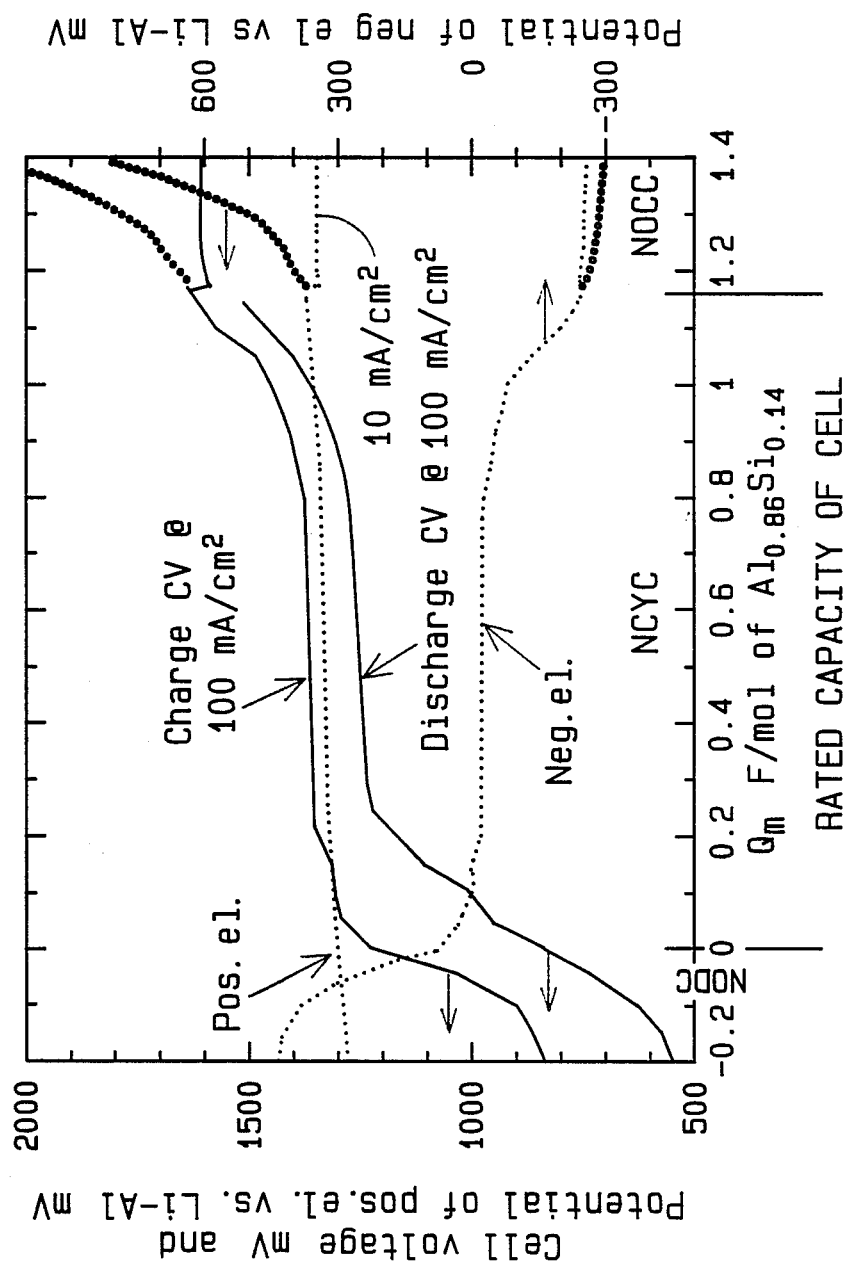
FIG. 2 is a graphical illustration of the variation of cell voltage and electrode potentials during charge and discharge with changes in the degree of charge of a lithium-alloy/metal sulfide cell.

Turning now to FIG. 2 where it is seen that a plateau in both charge and discharge cell voltage (CV) occurs in the central portion of the cell capacity. The cell voltage exhibits a decline or gradient towards the discharge end of its capacity but which gradient is primarily due to an increase or gradient in the negative electrode (Neg. el.) potential while the positive electrode (Pos. el) potential remains substantially constant. The positive and negative electrode potentials were determined with the reference electrodes and procedures described in U.S. Pat. No. 4,414,093 to Redey et. al. This reference electrode permits the independent determination of the state of charge in each electrode.

As is seen the positive electrode potential remains at the plateau voltage and the negative electrode exhibits a substantial upward gradient in the discharged end of their capacities designated NODC. It is by means of this gradient in negative electrode potential, resulting from the electrochemical action the low lithium activity phase, that overdischarge indication is achieved.

Figure 3:
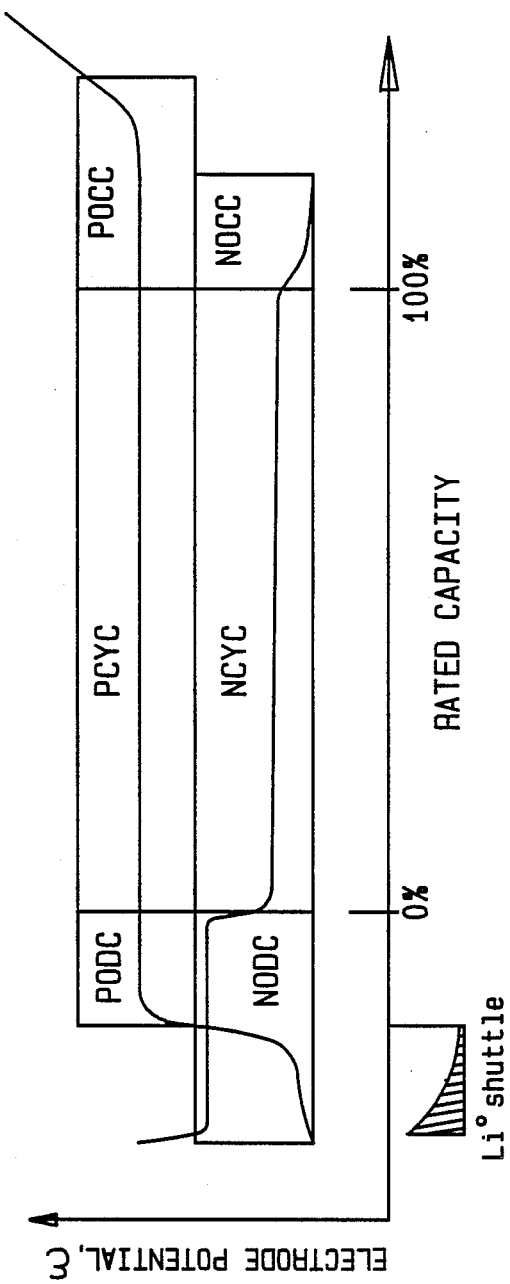
FIG. 3 illustrates the capacity ranges and electrode potentials of the positive and negative electrodes for a lithium alloy/metal sulfide cell.

In FIG. 3 the relative potentials for the positive and the negative electrode are illustrated for a cell that includes both overdischarge indication and overdischarge protection. The various sections of the electrode capacities are designated as follows PODC—Positive overdischarge capacity
NODC—Negative overdischarge capacity
PCYC—Positive cycled capacity
NCYC—Negative cycled capacity
POCC—Positive overcharge capacity
NOCC—Negative overcharge capacity The electrochemical cell of FIG. 3 is provided with the positive and negative electrode capacities aligned in the cell charge-discharge cycle such that all of the charged positive electrode material, i.e. transition metal chalcogenide, is consumed at a point in the discharge cycle with substantial low activity lithium phase remaining in the negative electrode. This is illustrated at the left hand edge of the PODC capacity section. When the most deeply discharged cells have reached this point further discharge of a battery of cells can be accommodated by a lithium shuttle mechanism in the deeply discharged cells. As will be discussed below, the shuttling of $Li^+$ and $Li^0$ species between the electrodes allows limited current flow after polarity reversal without the accompanying overdischarge damage to the deeply discharged cells.

The FIG. 3 cell also provides overdischarge indication and reserve capacity illustrated by the PODC section and matching portion of the NODC section. During discharge through these sections charged positive material electrochemically reacts with low lithium activity phase to contribute as a reserve to battery output. Current flow preferably is reduced to minimize electrode polarization and voltage drop when operating in this reserve capacity.

FIGS. 4A–4D show four examples of the invention with illustrations of the relative state of charge of each electrode throughout the full capacity of a cell. In each example the positive electrode capacity is proportional to the width of PODC+PCYC+POCC and the negative electrode capacity is proportional to the width of NODC+NCYC+NOCC. The relative state of charge of the two electrodes are linked to one another by formulating the electrode compositions at a preselected position in capacity and assembling the electrodes within the cell such that on charge and discharge the electrodes remain in correspondence along the width of the FIGS. 4A–4D bars. For example, the electrodes of FIGS. 4A to 4D can each be prepared with compositions corresponding to the capacities at the intersection of NODC with NCYC and PODC with PCYC or in the case of FIG. 4C at the discharged end of PCYC.

Figure 4:
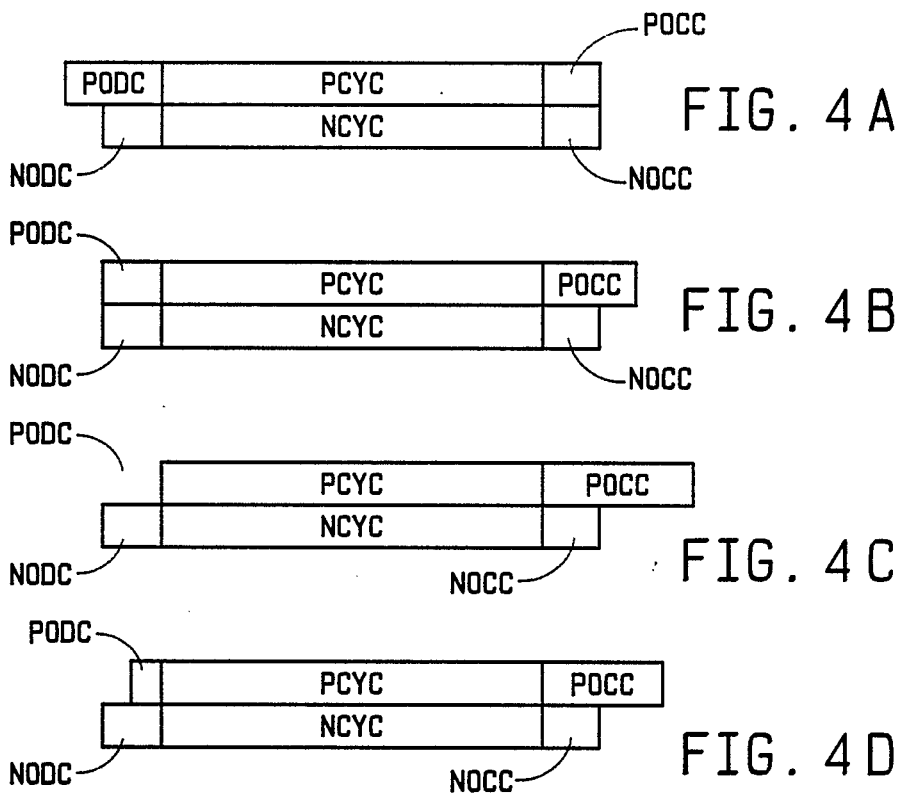
FIGS. 4A-4D are graphical representations of the combination of capacity ranges of electrodes in a lithium alloy/metal sulfide cell.

The four embodiments illustrated in FIGS. 4A to 4D have various combinations of overdischarge protection, overdischarge indication and overcharge protection. FIG. 4A illustrates good overdischarge indication, no overdischarge protection and marginal overcharge protection. Overdischarge indication is provided by NODC with corresponding PODC at the discharged end of the capacity. In FIG. 4B, good overdischarge indication and overcharge protection are provided. FIG. 4C gives good overdischarge and overcharge protection without overdischarge indication. The overdischarge protection is made possible by the NODC extending beyond the discharge of substantially all of the positive electrode material illustrated as PCYC. No PODC is shown as substantially all of the positive electrode is involved in the ordinary cycling of the cell. The more preferred embodiment illustrated in FIG. 4D is characterized by good overdischarge indication, good overdischarge protection and good overcharge protection. The PODC overlaps a portion but not all of the NODC to afford both overdischarge indication and protection. The characteristics of the overcharge protection is more fully described and illustrated in the co-pending U.S. patent application Ser. No. 227,021 cited above and incorporated by reference for this purpose.

The following examples are presented merely by way of illustration without limiting the invention beyond the full scope defined in the claims.

EXAMPLE I

An electrochemical cell is assembled with a positive electrode containing 0.58 gm. moles of $Li_2S$, 0.12 gm. moles of FeS and 0.58 gm. moles of Fe. The corresponding negative electrode includes 0.16 gm. mole of LiAlSi and 0.68 gm. mole of Al to provide a positive to negative electrode capacity ratio of 1.06. An electrolyte of LiF-LiCl-LiBr is immobilized between the electrodes in preparation for charging to the rated capacity. The cell as assembled is illustrated in FIG. 4A and includes a low lithium activity composition of $Li_{0.16}(Al_{0.84}Si_{0.16})$ linked to a positive electrode composition of $Li_{1.16}Fe_{0.7}S_{0.7}$.

EXAMPLES II–IV

Electrochemical cells corresponding to those illustrated in FIGS. 4B–4D are prepared with negative electrodes and electrolytes as in Example I but, with positive electrodes as follows in Table I below.

TABLE I

| POSITIVE ELECTRODE | FIG. 4B | FIG. 4C | FIG. 4D |
|---|---|---|---|
| $Li_2S$ | 0.62 | 0.7 | 0.66 |
| FeS | 0.08 | 0 | 0.04 |
| Fe | 0.62 | 0.7 | 0.66 |
| COMPOSITION | $Li_{1.24}Fe_{0.7}S_{0.7}$ | $Li_{1.4}Fe_{0.7}S_{0.7}$ | $Li_{1.32}Fe_{0.7}S_{0.7}$ |

Electrode capacity at low lithium activity phase, illustrated as NODC in FIGS. 4A–4D, is increased by including Si with Al in the negative electrode matrix. The low lithium activity phase begins essentially with alpha phase, typically $Li_{0.1}Al_{0.9}$ in the lithium-aluminum system. The addition of Si to the matrix increases the amount of Li capacity available as NODC up to equal molar amounts of Li, Al and Si. Preferably, Si is included in the Al-Si matrix in molar amounts of about $Al_{0.9}Si_{0.1}$ to $Al_{0.5}Si_{0.5}$. Greater amounts would unnecessarily decrease specific energy and smaller amounts would not appreciably alter the Al matrix.

The cells illustrated in FIGS. 4A, 4B and 4D provide good overdischarge indication due to the presence of NODC sections, at least a portion of which capacities are matched with PODC sections. The electrochemical reaction of the low lithium activity phase of the NODC sections with corresponding positive electrode material results in detectable reduced power output as an indication of near overdischarge. The FIG. 4C and 4D cells will allow good overdischarge protection as described in conjunction with FIG. 3. The FIG. 4B, 4C and 4D embodiments each provide good overdischarge protection as is described in copending U.S. patent application Ser. No. 227,021 cited and incorporated by reference for this purpose above. The preferred embodiment illustrated in FIG. 3 and in FIG. 4D provides not only good overcharge protection but also good overdischarge indication and overdischarge protection.

The NODC capacity when matched with PODC capacity at the positive electrode voltage plateau, not only provides indication of overdischarge, but also provides a reserve capacity that can be used for emergency operation. For example, in the operation of an electric vehicle at least a portion of the NODC capacity illustrated in FIGS. 4A, 4B and 4D can be used as such reserve to drive the vehicle to a recharging station prior to complete discharge or polarity reversal in cells with accompanying damage to the battery.

The overdischarge protection afforded by the FIGS. 4C and 4D embodiments relies on NODC capacity remaining after the PODC capacity has been discharged. Continued discharge beyond the available positive electrode material results in polarity reversal in the deeply discharged cells. The inventor has found that a limited current can be accommodated without damage to the cell through a lithium shuttling mechanism (FIG. 3). Lithium will be electrolytically deposited onto the current collector and electrode active metal remaining in the previously positive electrode. The deposited lithium will dissolve in and diffuse through the molten electrolyte back to the lithium electrode where it is again electrolytically converted to $Li^+$.

Figure 5:
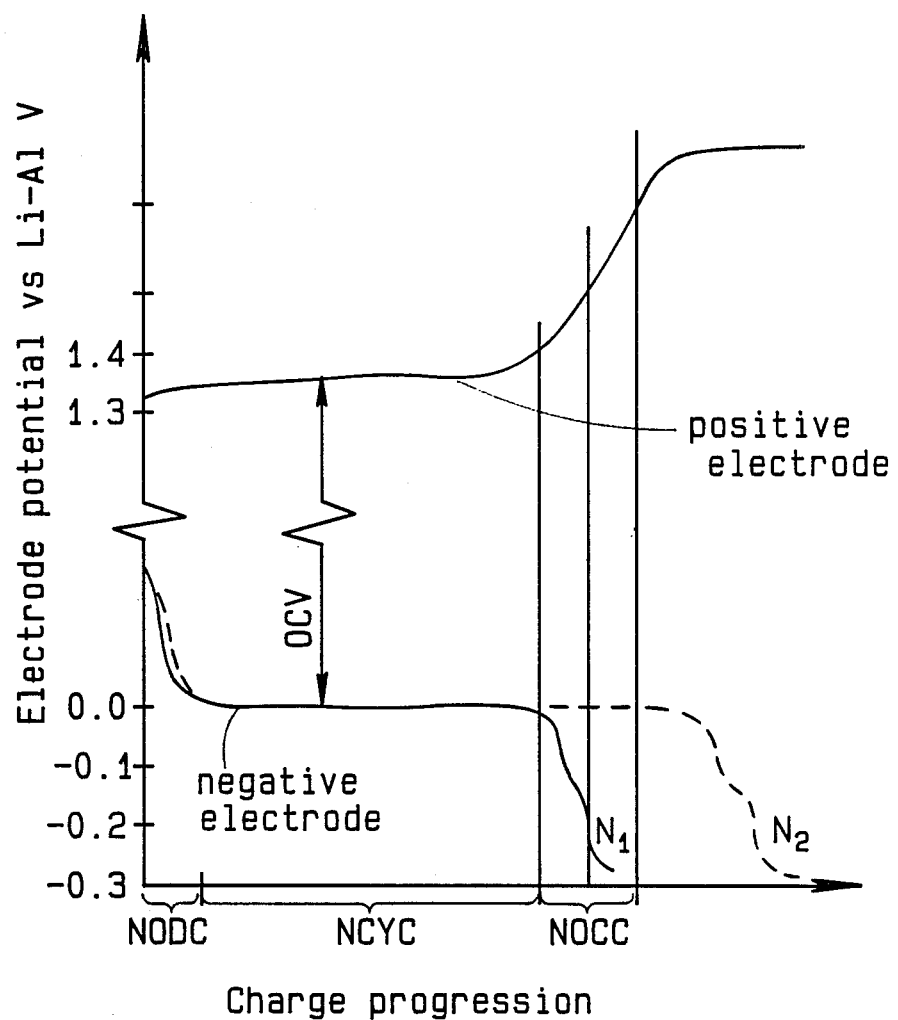
FIG. 5 is a graphical representation of the difference in positive and negative electrode potentials in terms of charge progression in a lithium-alloy/metal sulfide cell.

FIG. 5 illustrates the potential variation of the positive and the negative electrodes with the open circuit voltage (OCV) shown as the difference in electrode potential. It is seen that OCV will decrease within NODC as one indication of near overdischarge. However, cell current as power must also be considered during operation due to voltage drop resulting from electrode polarization. The curves labeled $N_1$ and $N_2$ represent two versions of the negative electrode with $N_2$ representing one which cannot provide overcharge protection as described in the above cited U.S. application Ser. No. 227,021.

In accordance with the method of the present invention, a battery of electrochemical cells are prepared with the capacities represented by PODC, NODC, PCYC, NCYC, POCC and NOCC arranged as described to obtain the desired overdischarge protection, overdischarge indication and overcharge protection. The battery is then operated with monitoring of voltage and current or power of the battery or the individual cells. On detection that the low lithium activity phase (represented by NODC) is being used to provide power, the current is limited to prevent damage while the reserve capacity is being used and to then limit current to that which can be accommodated by the $Li^0$-$Li^+$ shuttle mechanism.

Monitoring of the battery conditions can be achieved by metering the complete battery or by monitoring means coupled to individual cells of the battery. Such individual monitoring means are completely described in U.S. Pat. No. 4,238,721 to DeLuca et al. which patent is hereby incorporated by reference for this purpose. The disclosure of this patent not only permits monitoring of individual cells but also the shunting of cells when overcharge occurs. This same method and technique can be used in combination with the inventor's method to monitor and to shunt individual cells when an overdischarge condition occurs.

It is therefore seen that the present invention provides an electrochemical cell and method for overdischarge indication and protection. Through use of a low lithium activity phase a warning or indication of incipient overdischarge occurs permitting operation at a reduced output to avoid damage to the cell. Additionally, this provides a reserve capacity prior to complete discharge. At complete discharge or polarity reversal in a cell, a lithium shuttle mechanism is available for protection against overdischarge damage. The overdischarge protection and indication advantageously is used in combination with the overcharge protection described in U.S. patent application Ser. No. 227,021 cited above.

While particular embodiments of the present invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

The embodiments of this invention in which an exclusive property of privilege as claimed are defined as follows:

1. An electrochemical cell having overdischarge indication and reserve characterized by an output voltage plateau at the midportion of the cell cycle and a gradient in output voltage towards the discharged end of the cycle, said cell comprising:

a negative electrode containing lithium alloy as active material in the charged state and a matrix containing aluminum in the uncharged state, said negative electrode characterized by a voltage plateau at the central portion of the cell cycle and a gradient in voltage towards the discharge end of the cycle, said gradient in negative electrode voltage is attributable to the presence of a low lithium activity phase that is leaner in lithium than a corresponding phase present in the central portion of the cell cycle;

a positive electrode containing transition metal chalcogenide as active material in the charged state and transition metal with lithium chalcogenide as active material in the uncharged state, said positive electrode including sufficient charged active material to be present concurrently with said low lithium activity phase in the negative electrode wherein said cell exhibits electrochemical capacity at a lower output voltage than that of the output voltage plateau of the cell cycle; and an electrolyte disposed between said positive and negative electrodes and having high lithium solubility to allow for transfer of lithium between the electrodes.

2. The electrochemical cell of claim 1 wherein said negative electrode active material is selected from the group of lithium alloys consisting of LiAl, LiAlSi, LiAlFe, LiAlNi, LiAlCo, and four component compositions consisting of LiAlSi in mixture with a transition metal selected from Fe, Ni and Co.

3. The electrochemical cell of claim 1 wherein said low lithium activity phase consists essentially of Li, Si and Al and phases containing less lithium than that of LiSiAl phase.

4. The electrochemical cell of claim 1 wherein said cell is assembled within a battery of cells, and includes electronically conducting means connected to individual cells within the battery for indicating overdischarge condition and for electronically shunting an overdischarged cell from the battery of cells in response thereto.

5. The electrochemical cell of claim 1 wherein said positive electrode includes in addition to said charged active material, sufficient uncharged transition metal and lithium chalcogenide to remain during charging to beyond the capacity of the lithium alloy in the negative electrode whereby overcharge protection is provided in combination with said overdischarge indication.

6. The electrochemical cell of claim 1 wherein the state of charge of said negative electrode is selected in relation to the state of charge of said positive electrode to provide low lithium activity phase beyond the presence of active material in said originally positive electrode to provide the capability for $Li^+$-$Li^0$ shuttling and limited overdischarge current between the electrodes.

7. The electrochemical cell of claim 1 wherein said negative electrode includes low lithium activity phase containing lithium, aluminum and silicon matched by positive electrode active material to provide a reserve capacity at a reduced voltage output below the cycled capacity of the cell.

8. The electrochemical cell of claim 7 wherein said negative electrode includes a matrix containing aluminum and silicon in the atomic proportions of $Al_{0.1}Si_{0.9}$ to $Al_{0.5}Si_{0.5}$.

9. An overdischarge protection method in a battery of secondary electrochemical cells having lithium alloy negative electrodes and transition metal chalcogenide positive electrodes, said method comprising;
providing negative electrodes that exhibit a plateau in discharge voltage over a major portion of their discharge capacity and a gradient in discharge voltage at the discharged end of their capacity corresponding to a low lithium activity phase;
providing positive electrodes that exhibit a plateau voltage over a major portion of their discharge capacity extending into correspondence with said negative electrode voltage plateau and with a major portion of the capacity at said low lithium activity phase;
operating said battery while monitoring its output voltage and reducing its output current when voltage drop corresponding to the gradient in negative electrode voltage occurs to prevent irreversible damage in the most deeply discharged cells.

10. The overdischarge protection method of claim 9 wherein said negative electrode is provided with a lithium alloy including Al, and Si with Si included at an atomic amount of about 0.1 to 1.0 that of Al and wherein said low lithium activity phase is provided when the amount of un-reacted Li decreases to no more than the atomic fraction of Si.

11. The overdischarge protection method of claim 9 wherein sufficient positive electrode capacity is provided in respect to the negative electrode to extend the positive electrode plateau voltage to at least until all of the low lithium activity phase has been discharged and terminating the battery operation before a predetermined minimum in output voltage is reached.

12. The overdischarge protection method of claim 9 wherein sufficient low lithium activity phase is provided in respect to the positive electrode composition to extend beyond discharge of all of the transition metal chalcogenide and wherein said battery is discharged at said reduced output current beyond complete depletion of all of the transition metal chalcogenide in the most deeply discharged cells with overdischarge protection provided by a lithium shuttling mechanism.

13. The overdischarge protection method of claim 9 wherein the output voltage in individual cells in the battery of cells are monitored and the current through individual cells is limited or terminated by shunting around cells exhibiting output corresponding to the low lithium activity phase.

14. The overdischarge protection method of claim 9 wherein the discharge current in the cells of said battery are reduced to about 25% that of the operating current at plateau voltage when the gradient in negative electrode voltage is realized.

15. The overdischarge protection method of claim 9 in combination with overcharge protection wherein the positive electrodes of the electrochemical cells are provided with a transition metal capacity that extends beyond the rechargeable lithium alloy capacity and the cells are charged to near their lithium alloy capacity at a first charge rate and to beyond their lithium alloy capacity at a second reduced charge rate balanced by a lithium shuttle between the electrodes.

16. An electrochemical cell having overdischarge protection comprising a negative electrode having a lithium alloy capacity of NODC+NCYC+NOCC and a positive electrode having a capacity of at least PCYC+POCC and wherein the negative electrode capacity, NODC extends beyond the discharge of all matching positive electrode active material.

* * * * *